2 Sheets—Sheet 1.

H. KIRK.
Glass-Melting Furnace.

No. 208,401. Patented Sept. 24, 1878.

Witnesses:
J. K. Smith
L. C. Fitler

Inventor:
Henry Kirk
by Bakewell & Kerr
attys

2 Sheets—Sheet 2.

H. KIRK.
Glass-Melting Furnace.

No. 208,401. Patented Sept. 24, 1878.

Witnesses
J. K. Smith
L. C. Fäter.

Inventor.
Henry Kirk
By Bakewell & Kerr
Attys

UNITED STATES PATENT OFFICE.

HENRY KIRK, OF PITTSBURG, PENNSYLVANIA, ASSIGNOR TO HIMSELF AND CAMPBELL, JONES & CO.

IMPROVEMENT IN GLASS-MELTING FURNACES.

Specification forming part of Letters Patent No. 208,401, dated September 24, 1878; application filed September 6, 1878.

*To all whom it may concern:*

Be it known that I, HENRY KIRK, of Pittsburg, in the county of Allegheny and State of Pennsylvania, have invented a new and useful Improvement in Glass-Melting Furnaces; and I do hereby declare the following to be a full, clear, and exact description thereof, reference being had to the accompanying drawing, forming part of this specification, in which—

Figure 1:
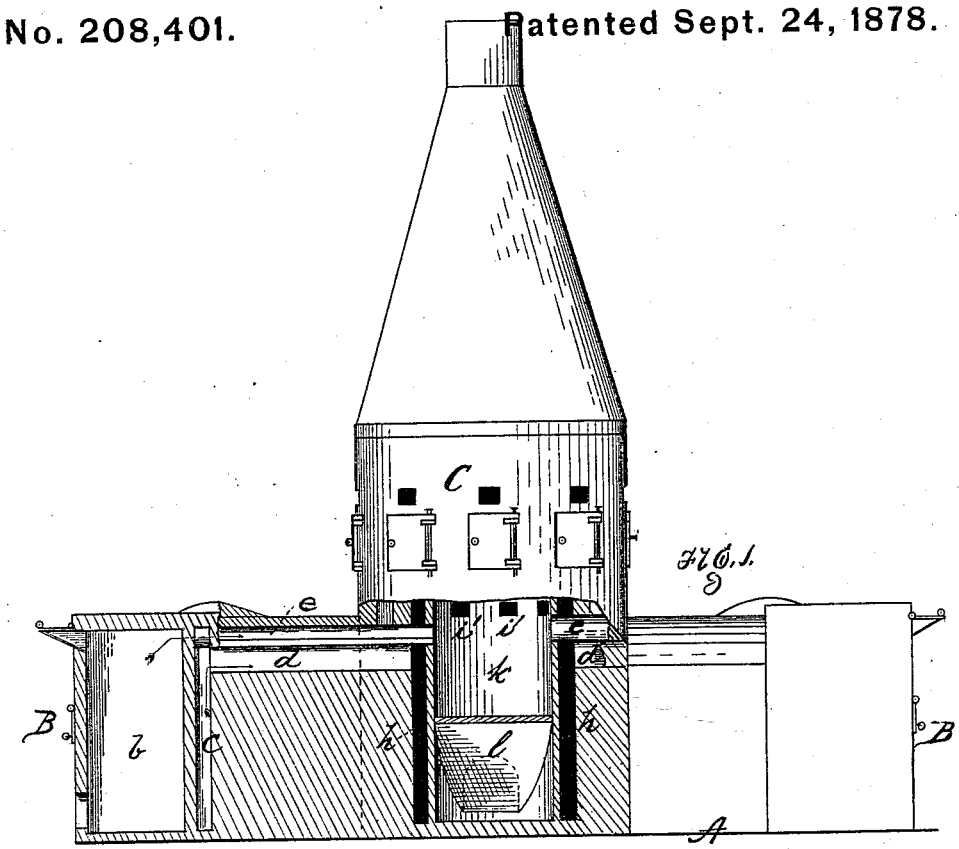
Figure 2:
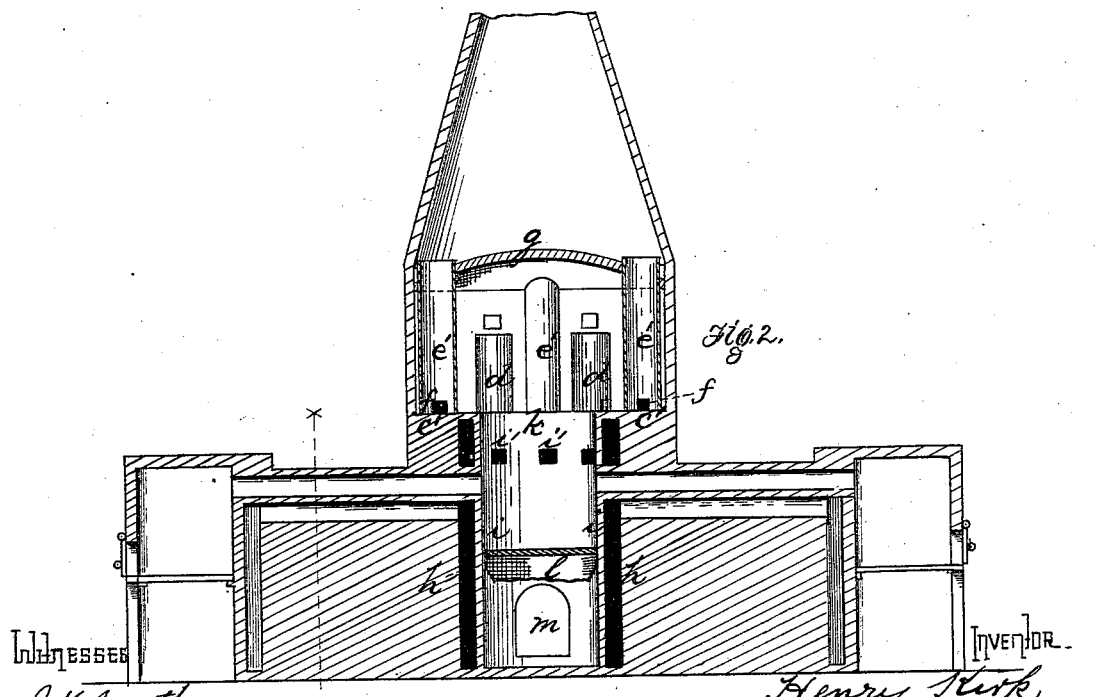
Figure 3:
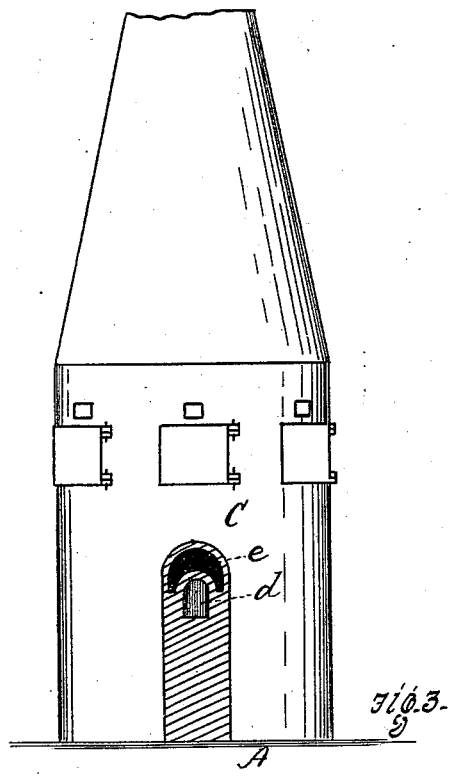
Figure 4:
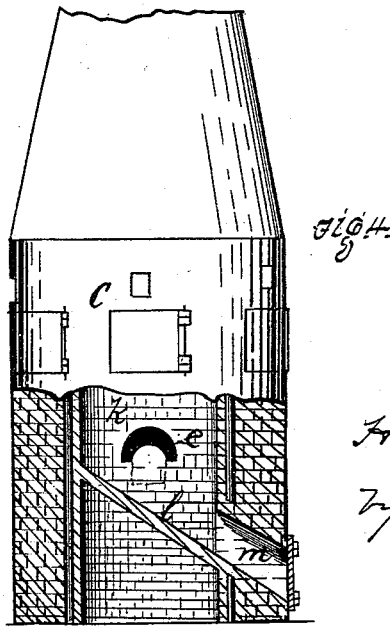

Figure 1 is an elevation, partly in section, of a furnace embodying my invention. Fig. 2 is a longitudinal section of the same; and Fig. 3 is a vertical section on the line $x\ x$, Fig. 2; and Fig. 4 is a transverse vertical section of the combustion-chamber.

Like letters refer to like parts wherever they occur.

My invention relates to the construction of that class of glass-melting furnaces wherein gaseous fuel is employed; and consists in such an arrangement of the air-flues within the gas-flues as shall cause the equalization of temperatures of the air and gas, whereby a more perfect combustion and uniform heat are obtained, and the furnace rendered more durable.

I will now proceed to describe my invention, so that others skilled in the art to which it appertains may apply the same.

In the drawing, A indicates the bed, upon which are erected the producers B B, one or several, according to the size of the furnace or requirements of the case. These producers are provided with the usual grates, charging-doors, and stoke-holes, and have hollow side walls, $b$, which I cause to unite with hollow back walls, $c$, when the air heated by its passage through the side and back walls of the producer is delivered into an arched flue, $d$, leading to the combustion-chamber.

$e$ indicates the gas-flue leading directly from the producer to the combustion-chamber, which flue I cause to rest upon and inclose the air-flue on at least a portion of three sides, so that the walls of the gas-flue shall be protected in a measure, and their durability increased, and so that the temperatures of the air and gas shall be equalized to a greater degree before entering the combustion-chamber. The form thus given to the gas-flue materially aids in the admixing of the air and gas, as, while the gas is delivered in a sheet, the air is jetted into it in divided or small streams.

C represents the melting-furnace, provided with the bench $c'$ for the pots $d$, and with combustion tubes or pipes $e'$, slotted below, as at $f$, and delivering above the crown or arch $g$, in the usual manner.

$h$ indicates an annular chamber or flue formed within the furnace by a suitable wall, $i$, said wall being perforated at points on line with, or somewhat above, the mouths of the gas-flues. The heated air from the flue $d$ is received in the chamber or flue $h$, and escapes by ports $i'$ into the combining or combustion chamber $k$, where it meets the gas issuing from the flues $e$.

The base or bottom of the combining or combustion chamber $k$, I form with a sloping bottom, $l$, contracted into funnel form, as at $m$, where it perforates the wall of the furnace, and terminating in a port preferably closed by a suitable door. Such construction enables the combustion-chamber to be readily cleaned, and in case of the breakage of a pot the glass can be saved without trouble or injury to the furnace.

The operation of the devices is as follows: The producers having been started, the gas given off will pass directly to the combining or combustion chamber $k$ by the flues $e$, where it will be delivered in strata, and where it will mingle with the air supply, which has passed through side walls, $b$, back wall, $c$, flue $d$, and annular chamber $h$, being projected in jets from the ports $i'$. The products of combustion, being deflected by arch $g$, will enter flues $e'$ through slots $f$, and finally escape from the stack. The location and arrangement of the air-flue with relation to the gas-flue are such that while the bottom of the gas-flue is protected and prevented from sagging under the effect of the heat, the air is at the same time effectually heated.

Having thus described the nature and advantages of my invention, what I claim, and desire to secure by Letters Patent, is—

1. In a glass-melting furnace wherein gaseous fuel is employed, the combination, with the producer and combining or combustion chamber, of an air and gas flue, the air-flue arranged within the gas-flue, substantially as and for the purpose specified.

2. The combination, in a glass-melting furnace, of the producer or gas-supply, the air-flue inclosed by the gas-flue and delivering into a perforated annular chamber surrounding the combining or combustion chamber, the whole constructed and operating substantially as and for the purpose specified.

In testimony whereof I, the said HENRY KIRK, of Pittsburg, Allegheny county, Pennsylvania, have hereunto set my hand.

HENRY KIRK.

Witnesses:
R. H. WHITTLESEY,
F. W. RITTER, Jr.